UNITED STATES PATENT OFFICE.

CHARLES G. MUSKAT, OF MILWAUKEE, WISCONSIN.

COMPOSITION FOR COVERING AND INSULATING ELECTRIC WIRES.

SPECIFICATION forming part of Letters Patent No. 304,020, dated August 26, 1884.

Application filed June 26, 1884. (Specimens.)

To all whom it may concern:

Be it known that I, CHARLES G. MUSKAT, a citizen of the United States, residing at Milwaukee, in the county of Milwaukee and State of Wisconsin, have invented a new and useful Composition of Matter to be Used for Covering and Insulating Electric Wires; and I do hereby declare that the following is a full, clear, and exact specification of the invention.

My composition consists of the three ingredients, castor-oil, gum-copal, and powdered slate, combined in the following manner, in the proportions stated, viz: One pound of castor-oil (Oleum ricinus) is boiled with two pounds of gum-copal broken into small pieces, stirring it until all gum is molten, and then adding three pounds of powdered slate, (silicate of alumina,) stirring well until all the ingredients are assimilated. At this temperature (about 600° Fahrenheit) the mass is molded around the wire by proper machinery. The powdered slate serves only to harden the solution of gum-copal in castor-oil, and can be substituted by the same quantity of powdered pumice-stone, powdered chalk or clay, umber, or any powdered insoluble and insulating material.

What I claim, and desire to secure by Letters Patent of the United States, is—

The herein-described composition to be used for insulating and water-proof covering of wires, consisting of castor-oil, gum-copal, and powdered slate, in the proportions specified.

CHARLES G. MUSKAT.

Witnesses:
A. C. GIESELER,
N. H. HAAN.